US005562278A

United States Patent [19]

Müller et al.

[11] Patent Number: 5,562,278

[45] Date of Patent: Oct. 8, 1996

[54] APPARATUS FOR PROCESSING PRINTED PRODUCTS

[75] Inventors: Erwin Müller, Oberdürnten; Werner Honegger, Tann-Rüti, both of Switzerland

[73] Assignee: Ferag AG, Hinwi, Switzerland

[21] Appl. No.: 427,146

[22] Filed: Apr. 24, 1995

[30] Foreign Application Priority Data

Apr. 28, 1994 [CH] Switzerland .......................... 01316/94

[51] Int. Cl.[6] ........................ B65H 85/00; B65H 39/045; B65G 37/00

[52] U.S. Cl. .................. 270/58.21; 270/52.2; 198/346.2; 198/347.1

[58] Field of Search .................................. 270/54, 55, 57, 270/58; 198/346.2, 347.1, 347.2

[56] References Cited

U.S. PATENT DOCUMENTS

| | | | |
|---|---|---|---|
| 3,522,942 | 8/1970 | Hepp | 198/346.2 X |
| 3,951,399 | 4/1976 | Reist | 270/58 |
| 4,034,974 | 7/1977 | Maopolski | 270/55 |
| 4,058,202 | 11/1977 | Reist et al. | 270/55 X |
| 4,678,174 | 7/1987 | Reist | 270/54 |
| 4,734,005 | 3/1988 | Blumberg . | |
| 4,981,291 | 1/1991 | Honegger et al. | 270/55 |
| 5,019,716 | 5/1991 | Meier et al. | 270/55 |
| 5,050,851 | 9/1991 | Eugster | 270/55 |
| 5,052,666 | 10/1991 | Hansch | 270/55 |
| 5,052,667 | 10/1991 | Hansch | 270/55 |
| 5,098,076 | 3/1992 | Kelsey | 270/54 |
| 5,104,108 | 4/1992 | Honegger . | |
| 5,267,821 | 12/1993 | Bodart et al. | 270/54 X |
| 5,275,685 | 1/1994 | Stauber . | |
| 5,292,110 | 3/1994 | Honegger | 270/55 |
| 5,324,014 | 6/1994 | Honegger et al. | 270/55 |
| 5,326,209 | 7/1994 | Duke | 270/54 X |

FOREIGN PATENT DOCUMENTS

| | | | |
|---|---|---|---|
| 62-269812 | 11/1987 | Japan | 198/346.2 |

*Primary Examiner*—John E. Ryznic
*Attorney, Agent, or Firm*—Brinks Hofer Gilson & Lione

[57] ABSTRACT

Printed products are fed, from feeding sections, to the processing drum and deposited in a straddling manner on the wall elements or on printed products which have already been deposited thereon. As the processing drum revolves, the printed products are passed onto a circulating conveyor to carry out processing steps on the printed products or to add additional printed products or inserts. The printed products are then fed to the other feeding sections of the processing drum, where additional printed products are added. A removal conveyor for receiving and transporting the finished products away is located at the removal section of the processing drum.

10 Claims, 5 Drawing Sheets

Fig.2
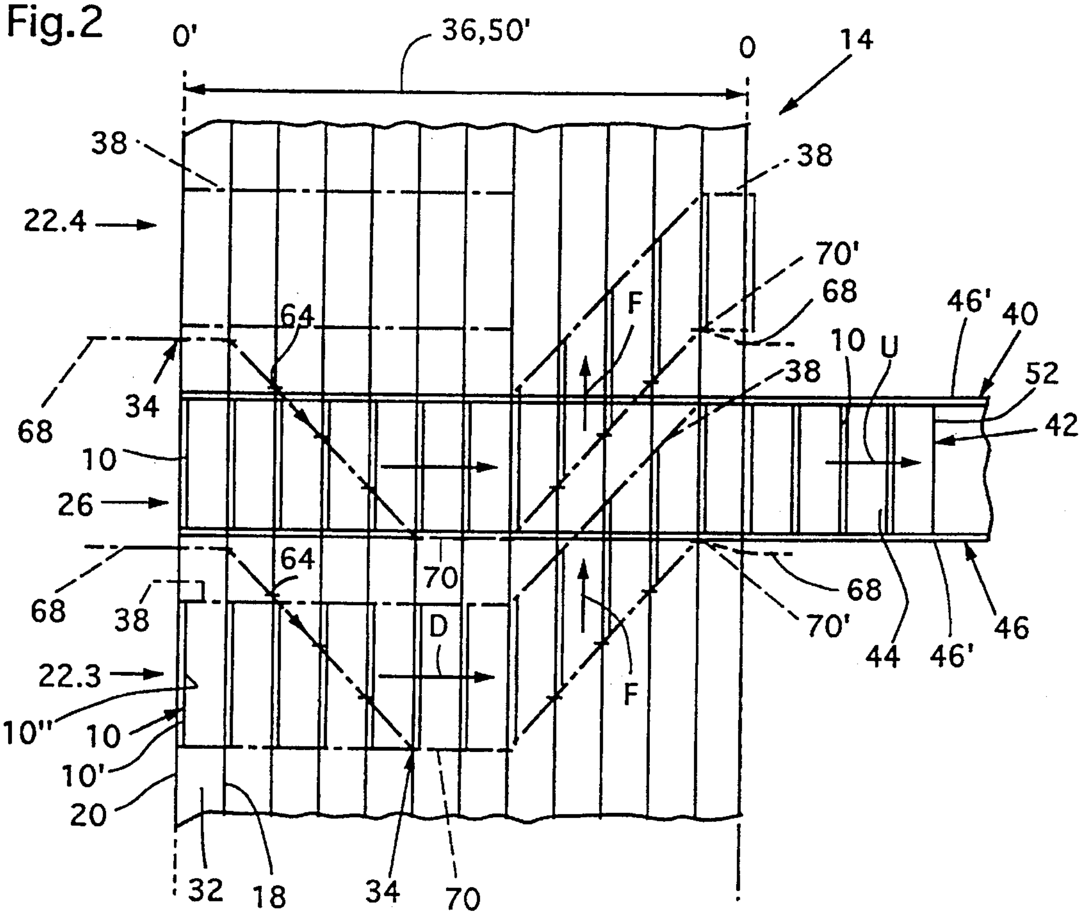
Fig.3
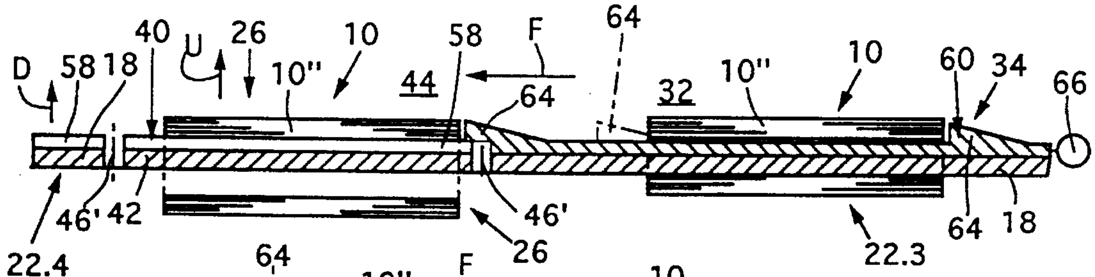
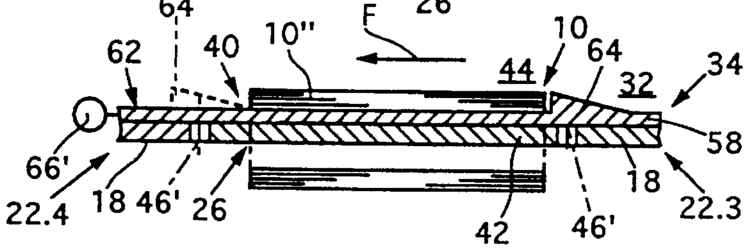
Fig.4

Fig.8
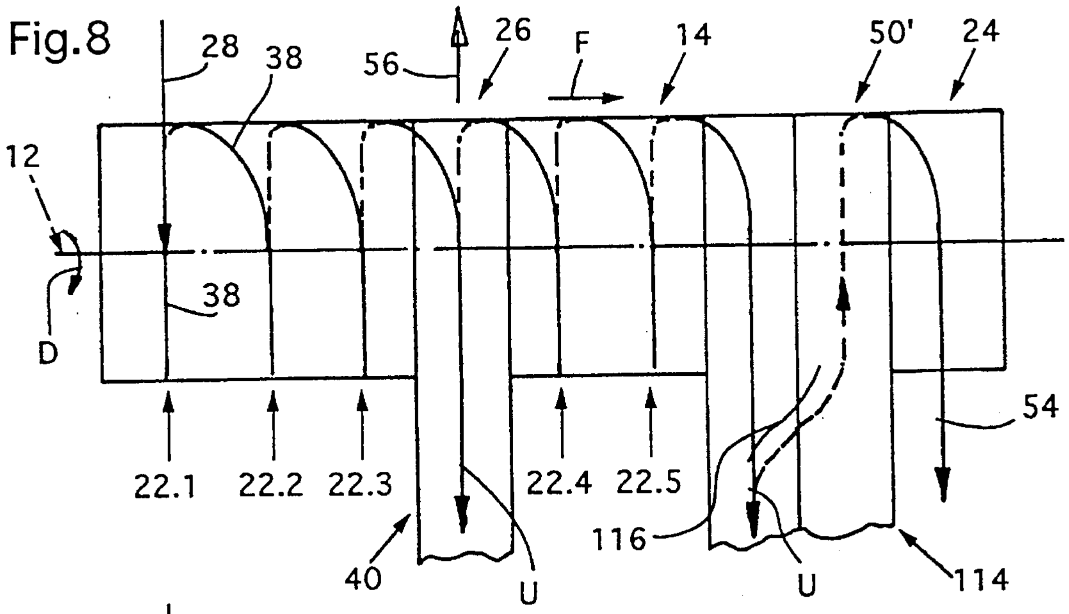
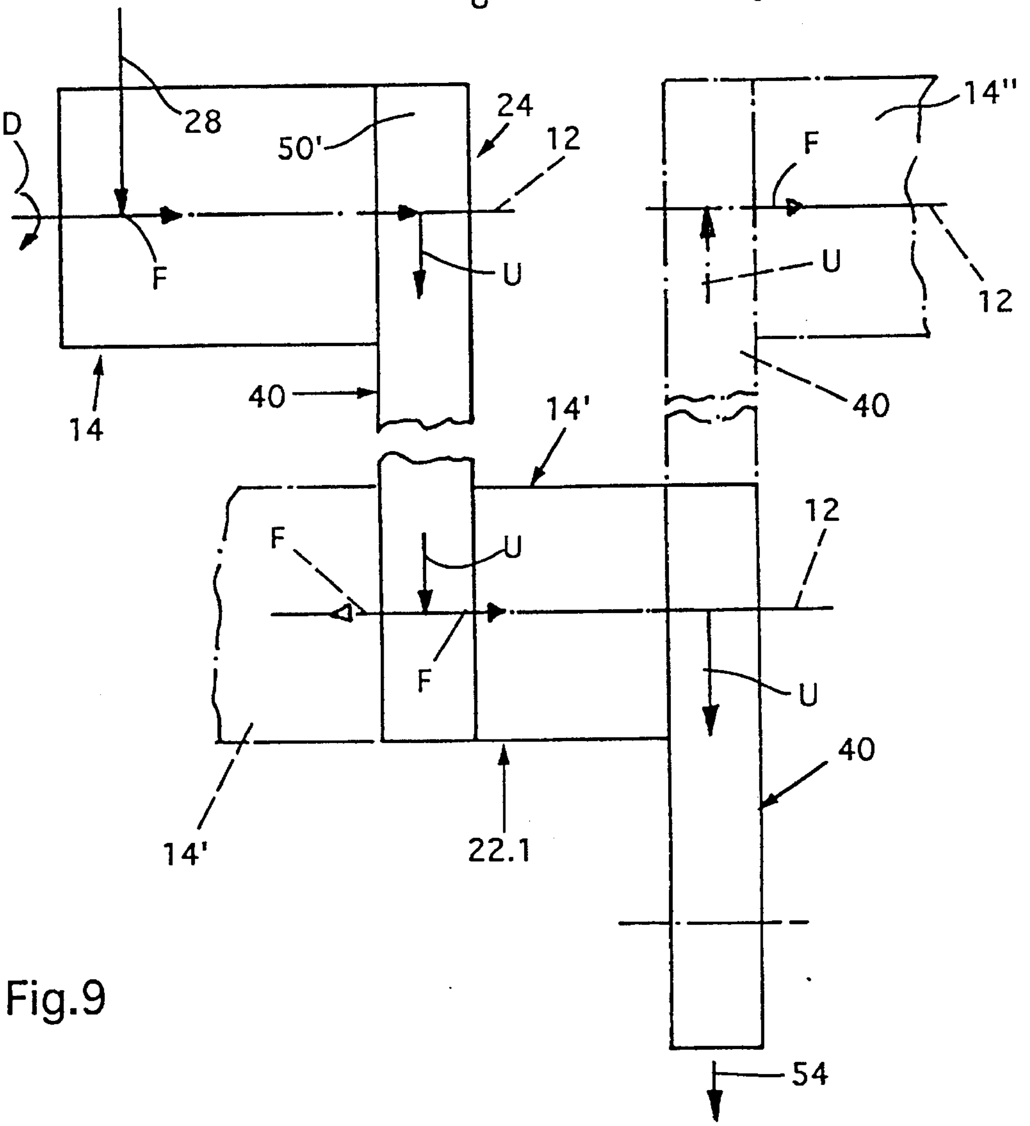
Fig.9

APPARATUS FOR PROCESSING PRINTED PRODUCTS

BACKGROUND OF INVENTION

The present invention relates to an apparatus for processing printed products that have been fed to a processing drum having a generally horizontal axis of rotation.

An apparatus of this type is disclosed in U.S. Pat. No. 5,324,014 and the corresponding EP-A-0550828 application. At a first end section of the processing drum, folded printed products can be deposited in a straddling manner on wall elements of the processing drum by a gripper conveyor. At a second end section, located at the other end of the processing drum, printed products that have been processed in the processing drum are removed by a gripper conveyor. The apparatus has, one behind the other, a multiplicity of sections to which processing and/or feeding stations are associated. The feeding stations are designed to deposit folded printed products in a straddling manner on top of the printed products which have already been deposited on the wall elements or to introduce inserts, at the correct page, into the compartments defined by the wall elements. At processing stations, inserts can be adhesively bonded, at the correct page, to the printed products, or the collected printed products can be stapled together.

Another apparatuses having a processing drum that is intended for processing printed products is disclosed in U.S. Pat. Nos. 5,052,667, 5,052,666 and 4,981,291 and the corresponding EP-A-0341425, EP-A-0341424 and EP-A-0341423 applications. The apparatuses disclosed in these patents permit folded printed products to be collected, by being deposited one upon the other in a straddling manner on the wall elements of the processing drum. The printed products are, if appropriate, stapled, collated by laying them one beside the other or inserted into other folded printed products.

Furthermore, U.S. Pat. No. 4,678,174 and the corresponding EP-A-0218804 applications disclose an apparatus having a processing drum, which has collecting conveyors which are arranged around the axis of rotation. As the drum revolves, the collecting conveyors are pivoted around the axis of rotation such that they maintain their position. The removal device in the form of a removal conveyor has retaining members fastened at intervals on a circulating chain. Each retaining member is provided with two tongue-like clamping members which pivot in between the printed-product halves. The printed-product halves are raised up from one another by a lifting device. Supported by these clamping members in the region of the fold, the printed products are conveyed away from the processing drum and fed to another processing drum. At the second processing drum the printed products are opened, by pivoting the clamping members that are engaged between the printed-product halves, and, by pivoting the clamping members out, are allowed to fall onto collecting conveyors.

There are processing operations that must be performed on printed products which cannot be carried out in processing drums or can only be carried out therein at great expense. Furthermore, there are processing operations which require a considerable amount of time or comprise a number of successive operating steps. Such operations require that the processing drum has a large overall length. However the processing capacity, of such large overall length processing drums, remaining the same which, in addition to the increased space requirement, can also result in structural problems.

The object of the present invention is to improve the prior art mechanism such that processing steps which are time-consuming or can only be carried out with difficulty in the processing drum are able to be performed without increasing the overall length of the processing drum.

SUMMARY OF THE INVENTION

According to the invention, certain processing steps on the printed products or the addition of further products to the printed products are no longer carried out in the processing drum, but in a circulating conveyor. In this arrangement, when the printed products are passed on from the processing drum to the circulating conveyor and from the circulating conveyor to the processing drum, they retain their form. Since the circulating conveyor can be guided along virtually any movement path, this provides the opportunity for a vast range of different processing steps. The circulating conveyor offers, in particular, the possibility of guiding the printed products away from the processing drum, for carrying out special processing steps or for feeding additional products, and of guiding the printed products back to said processing drum again for the purpose of further processing. An additional advantage is that the circulating conveyor makes it possible to pass on the printed products from one processing drum to the other, it being possible, while the printed products are being passed on, to process the same or to feed additional products. Furthermore, the present invention makes it possible to carry out special processing steps or add additional products while the products are being fed between processing drums or in the removal device. This can be accomplished through this invention while the printed products retains its original form. The apparatus according to the invention can be used for processing printed products which are arranged in a straddling manner on the wall elements of the processing drum and the separating elements of the circulating conveyor and/or are introduced, between the wall elements, into the compartments of the processing drum and, between the separating elements, into the receiving compartments of the circulating conveyor.

BRIEF DESCRIPTION OF THE INVENTION

The present invention is explained in more detail with reference to embodiments that are shown schematically in the following drawings:

FIG. 2 is a projected development of part of the processing drum and the circulating conveyor, to the left of the vertical plane, designated by 0–0' in FIG. 1, through the axis of rotation of the processing drum.

FIG. 3 shows reciprocating conveying elements which are arranged on a wall element of the processing drum and are intended for transporting the printed products in the longitudinal direction of the processing drum and into the circulating conveyor.

FIG. 4 shows a conveying element which is guided on a wall element and is intended for displacing the printed products from the circulating conveyor into the processing drum.

FIG. 8 shows a plan view of the processing drum having a first and a second circulating conveyor, the printed products, in the second circulating conveyor, being displaced transversely with respect to the circulating direction.

FIG. 9 shows a plurality of processing drums, the printed products being passed on from one processing drum to the other by means of circulating conveyors.

DETAILED DESCRIPTION OF THE PREFERRED EMBODIMENT

Figure 1:
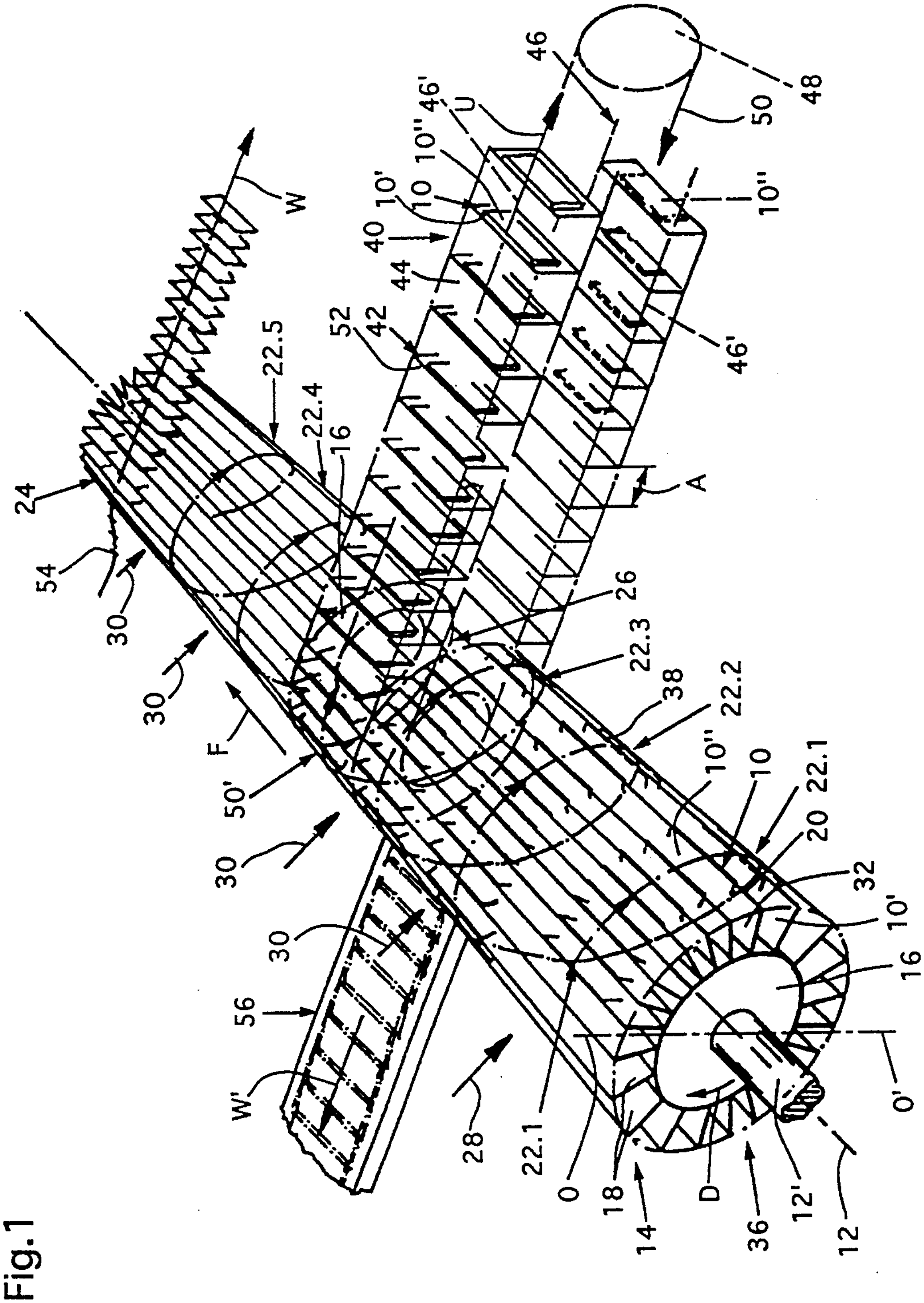
FIG. 1 is a perspective representation of an apparatus according to the invention, having a processing drum for processing folded printed products, and having a circulating conveyor which is arranged in the central region of the processing drum and intended for carrying out special processing steps on the printed products.

FIG. 1 shows an apparatus for processing printed products 10, having a processing drum 14 which is driven continuously about a generally horizontal axis of rotation 12, in the direction of rotation indicated by arrow D. Arranged on a rotary shaft 12', which is coaxial with respect to the axis of rotation 12, is a cylindrical or roller-like supporting element 16 and is connected in a known manner to a drive motor. The processing drum 14 is mounted at both ends on a machine stand (not shown). Radial wall elements 18 project outwardly from the supporting element 16. The wall elements 18 are distributed uniformly along the circumference of the processing drum 14 and their radially outer edges, form saddle-like rests 20 which extend generally parallel to the axis of rotation 12.

The processing drum 14 has, at its end region on the left-hand side in FIG. 1, a first feeding section 22.1 and, at the other end region on the right-hand side of FIG. 1, a removal section 24. Beginning at the first feeding section 22.1 and extending in the direction of arrow F toward the removal section 24, the first feeding section 22.1 is followed by two additional feeding sections 22.2 and 22.3, a circulating-conveyor section 26 and, two additional feeding sections 22.4 and 22.5. The wall elements 18 extend across all the feeding sections 22.1 to 22.5, but are interrupted in the circulating-conveyor section 26.

The first feeding section 22.1 has an associated feeding device 28 which is indicated by an arrow and serves to open each folded printed product 10 and to deposit it in a straddling manner on the passing saddle-like rest 20. For this purpose, the feeding device 28 exhibits a clamp conveyor and an opening device, as disclosed, for example, in U.S. Pat. No. 5,324,014 and the corresponding EP-A-0550828 applications, or other generally known feeder. Each additional feeding section 22.2 to 22.5 are assigned correspondingly designed feeding devices 30 which are likewise designated by an arrow and serve to deposit in each case additional folded printed product 10, in an opened state, and in a straddling manner on top of the printed products 10 which have already been deposited on the rests 20. The product halves 10" of the printed products 10, which are connected to one another by the fold 10', each extend into a compartment 32 which is a part of the processing drum 14. Each compartment 32 is defined by a pair of adjacent wall elements 18.

All sections 22.1 to 22.5, 24 and 26 of the processing drum 14 are of equal length, as measured along the axis of rotation 12. Each wall element 18 has associated therewith, one behind the other and spaced apart by said lengths, conveying elements 34 the construction and function of which will be described in more detail with reference to FIGS. 2 to 4. The conveying elements 34 function to convey the printed products 10 (in conveying direction F) from one section of the processing drum 14 into the respectively following section thereof. This conveying function occurs during rotation of the processing drum 14, only in a section designated 36. Section 36, as seen when looking down the axis of rotation 12, begins at coordinate 0', extends in the direction of rotation D through approximately 180° and terminates at coordinate 0. A return displacement of conveying elements 34 occur, counter to the direction of arrow F. The printed products 10 in the processing drum 14, thus follows a helical path 38, which is indicated by chain-dotted lines.

The circulating-conveyor section 26 is associated with a circulating conveyor 40 which functions to guide the printed products 10 which have been fed to it from the feeding section 22.3 (in conveying direction F) away from the processing drum 14, in the direction of arrow U, for carrying out specific processing steps on the printed products 10, and to guide the latter back to said processing drum 14, where they are then fed to the feeding section 22.4 in order to be supplemented with further printed products 10.

The circulating conveyor 40 has separating elements 42 which correspond to the wall elements 18 of the processing drum 14 and separate receiving compartments 44, which correspond to the compartments 32 of the processing drum 14. The separating elements 42 are spaced apart by a distance A, and are carried by an endless drawing member 46, for example two chains 46'. The endless conveyor member 46 or chains 46' are guided around the supporting element 16 of the processing drum 14 and a cylindrical drum-like deflection member 48. The wheel-like deflection member 48 is spaced from the processing drum 14 in the horizontal direction and its axis of rotation is parallel to the axis of rotation 12. The endless conveyor 46 or chains 46' thus has an oblong movement path 50. The distance A between the separating elements 42 corresponds to the distance between the wall elements 18 in the region of the base of the compartments 32. As a result when the circulating conveyor 40 runs through a section 50', of its movement path 50 that corresponds to the section 36 of the rotary path of the wall elements 18, the separating elements 42 are in alignment with said wall elements 18, as seen when looking in the direction of the axis of rotation 12. Thus in the section 50' of the movement path 50 of the circulation conveyor 40, the separating elements 42 span the gap between the wall elements 18 of the circulating-conveyor section 26. Since the separating elements 42 are aligned with the wall elements 18 in the section 36, 50', and the receiving compartments 44 are also in alignment with the compartments 32.

The radially outer ends of the separating elements 42 each form a rest saddle 52 on which the printed products 10, which have been fed to the circulating conveyor 40, rest on their folds 10'.

The removal section 24 has an associated removal conveyor 54 which is designed as a clamp conveyor that grips the printed products 10, that have been processed along the processing drum 14 and in the circulating conveyor 40, in the region of the folds 10' and conveys them away in the direction W.

As is indicated by a belt conveyor 56, it is also possible and desirable in some situations to transport the printed products 10, after processing in circulating conveyor 40, away from the circulating conveyor and the processing drum 14 in the direction W'. Depending on the desired processing of the printed products 10, a belt conveyor 56 could be arranged beneath one of the feeding sections 22.1 to 22.5 or beneath removal section 24 in order to convey the correspondingly processed printed products 10 away.

An embodiment of the invention is illustrated in FIGS. 2 to 4 that includes a conveying element 34 for the stepwise transportation of the printed products 10 along the axis of rotation 12. FIG. 3 is a section view taken through a wall element 18 in the region of the feeding section 22.3 and a part of the feeding section 22.4, and through a separating element 42, of the circulating conveyor 40, in the circulating-conveyor section 26. The section view extends parallel to the axis 12 and at right angles to an axial plane running through the wall element 18. The wall element 18 and the separating element 42 have a guide groove 58 which, as seen, when looking in the direction of rotation D and in the direction of circulation U, is open and runs parallel to the axis of rotation 12. Two carriages 60, 62 are guided in the guide groove 58. The first carriage 60 is associated with that part of the processing drum 14 that is arranged on one side of the circulating conveyor 40, for example the feeding sections 22.1 to 22.3. The second carriage 62 is associated with the part which is arranged on the other side, for example the feeding sections 22.4, 22.5 and the removal section 24.

The first carriage 60 (FIG. 3) has three sliding cams 64 that project, beyond the wall element 18, into the compartment 32 preceding the wall element 18, as seen in the direction of rotation D. The sliding cams 64 are spaced apart from one another, in the direction of the axis of rotation 12, by the length of a section 22.1–22.5, 24 or 26 of the processing drum 14. The first carriage 60 is connected to a displacement drive 66 that causes, as the processing drum 14 revolves once, the carriages 60 to move, in the conveying direction F, a distance equal to an operating displacement and, in the opposite direction (indicated in FIG. 3 by a broken-lined arrow tip), by a return displacement. The sliding cams 64 have a wedge-shaped cross-section and during a return displacement, go under the product halves 10 butting against the wall element 18 in the path section 36, 50' (sliding cam 64 indicated by broken lines). In an operating displacement, the sliding cams 64 push the printed products 10 in the conveying direction F by butting against the trailing edge of a product half 10", as seen in conveying direction F. The sliding cams 64 associated with the first two feeding sections 22.1 and 22.2 are intended to displace the printed products 10 in each case into the following feeding section 22.2 and 22.3, respectively, whereas the sliding cam 64 associated with the third feeding section 22.3 is intended to displace the printed products from this feeding section 22.3 into the circulating-conveyor section 26, to thus push the printed product 10 onto the corresponding separating element 42 of the circulating conveyor 40. It Should be noted that the carriage 60, terminates, at its left end as seen in FIG. 3 at the sliding cam 64 that pushes the printed product 10 into the corresponding separating element 42.

The second carriage 62 (FIG. 4) is of a length, as seen in the direction of the axis of rotation 12, that corresponds essentially to the two feeding sections 22.4 and 22.5 and to the removal section 24. Sliding cams 64 likewise project, from carriage 62, from points that are spaced at a distance which corresponds to the length of a section of the processing drum 14, into the compartment 32. The second carriages 62 are connected either to a second displacement drive 66' which corresponds to the displacement drive 66 or, for example by means of a shaped piece which spans the circulating-conveyor section 26 within the wall elements 18, as seen in the radial direction, to the respectively corresponding first carriage 60, with the result that the carriages 60, 62 assigned to a wall element 18 move synchronously with respect to one another. The sliding cam 64 assigned to the feeding section 22.4 is intended to go under the product half 10", of the printed product 10 butting against the separating element 42 in the movement-path section 50' (sliding cam 64 indicated by broken lines) and, during a conveying displacement to push said printed product 10 in conveying direction F into the feeding section 22.4. Correspondingly, the sliding cams 64 assigned to the feeding section 22.5 and the removal section 24 are intended to convey the printed products 10 from the feeding sections 22.4 and 22.5 into the feeding section 22.5 and the removal section 24, respectively.

Preferred embodiments, of the displacement drive 66, 66' are disclosed, for example, in U.S. Pat. No. 4,058,202, and the corresponding CH-A-575303 patent and U.S. Pat. Nos. 5,052,657, 5,052,666 and 6,981,291 and corresponding EP-A-0341423, EP-A-0341425, EP-A-0341424 applications. The above identified U.S. Pat. Nos. 4,058,202, 5,052,667, 5,052,666 and 6,981,291 are all included by reference as a part of this disclosure.

FIG. 2 shows a projected development of the rotary-path section 36 of the feeding sections 22.3 and 22.4 of the processing drum 14, and of the circulating-conveyor section 26, arranged therebetween. This projected development includes the movement-path section 50' of the separating elements 42 and receiving compartment 44 and a part of the rectilinear section of the movement path 50. As is indicated by the chain-dotted lines 68, the sliding cams 64 at the mutually facing ends of the carriages 60 and 62 assume, when they run, in the direction of rotation D, into the rotary-path section 36 at coordinate 0', a rest position in which the two carriages 60, 62 do not move into the circulating conveyor 40. Subsequently, the carriages 60, 62 are moved in the direction opposite to the conveying direction F, by the displacement drives 66, 66', into a first end position 70 which, as seen in conveying direction F, is arranged in the initial region of the sections 22.1–22.5, 26 of the processing drum 14. The first end position 70 is reached after approximately a quarter revolution of the processing drum 14. Thereafter, the carriages 60, 62 are moved along conveying direction F, by a conveying displacement, into the second end position 70'. When moving into second end position 70' the printed products 10 are carried along and pushed into the following section 22.2–22.5, 24, 26. Then, a part of the return displacement occurs, moving in a direction counter to the conveying direction F. This results in a movement out of the second end position 70' into the rest position. In this rest position, there are no carriages 60, 62 extending into the circulating conveyor 40. Thus, the separating elements 42 and the receiving compartments 44 of the circulating conveyor 40 can separate from the wall elements 18 and compartments 32 of the processing drum 14 at the coordinate 0.

Control clamps, of the type disclosed in the above identified U.S. Pat. Nos. 4,058,202, 5,052,667, 5,052,666 and 6,981,291 could be used rather than the sliding cams 64, for transporting the printed products in the direction of the axis of rotation 12.

It should be noted that the feeding device 28 and/or the feeding stations 30 feed the printed products 10 to the processing drum 14 outside the rotary-path section 36. Or stated in other words the printed product 10 is fed to locations where the printed products 10 are not being conveyed in the direction of the axis of rotation 12.

Figure 5:
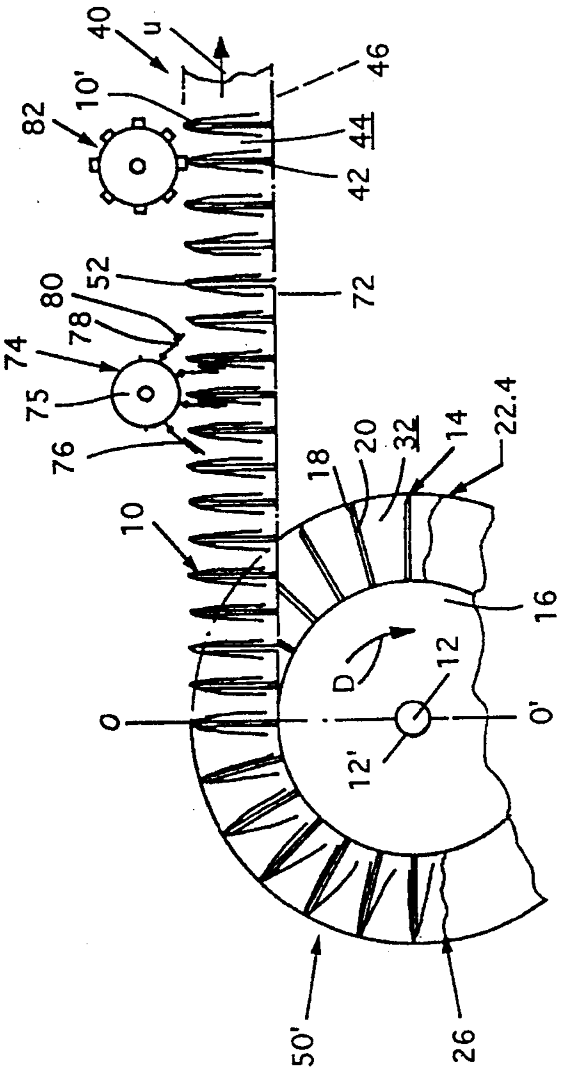
FIG. 5 shows a section through the apparatus of FIG. 1 in a plane running at right angles to the axis of rotation of the processing drum, in a region where the processing drum and the circulating conveyor abut.

FIG. 5 shows, as an example, two processing steps which can be carried out on the printed products 10 which have been previously collected in the processing drum 14 and then fed to the circulating conveyor 40. Arranged above the upper strand 72 of the circulating conveyor 40 is a station 74 for the adhesive bonding of inserts 76, such as cards or product samples. Stations 74 of this type are disclosed, for example, in U.S. Pat. No. 5,275,685 and the corresponding EP-A-0540865 application and the corresponding U.S. patent application Ser. No.08/175,967, CH Patent Application No. 107/93-2 of 14 Jan. 1993. Pivotably arranged on a supporting body 75, which is rotatably driven, are extension arms 78 which have retaining members 80 at their ends in order to introduce the inserts 76, fed from a magazine, into the receiving compartment 44, between separating elements 42, of the circulating conveyor 40. The inserts 76 are adhesively bonded into the printed products 10 at the right page. A stapling station 82 is provided downstream of the adhesive-bonding station 74 for stapling together at the fold 10' those printed products 10 which have been provided with an insert 76. If there is no need for any further processing or the addition of further printed products, the stapled printed products 10 are conveyed away by means of the belt conveyor 56, see FIG. 1. On the other hand, the stapled printed products 10 can be fed back to the drum section 22.4 for further processing.

The feeding device 28 and feeding stations 30, can in addition to depositing the printed products 10 in a straddling manner on the rests 20, also deposit printed products into the compartments 32, between wall elements 18. When a folded printed product 10 is deposited into the compartments 32 with the fold 10' in first, these printed products 10 can be opened while in the processing drum 14 and, by means of further feeding stations 30, further printed products 10 or inserts 76 can be inserted into the opened printed product 10. An embodiment of a drum-like processing apparatus which is particularly suitable for this purpose is disclosed in U.S. Pat. No. 4,058,202 and the corresponding CH-A-575 303 patent. Reference is also made to these documents, for a disclosure of a device 84 for opening and holding-open by which, during conveying of the printed products 10 in the direction of the axis of rotation 12, the printed products are opened and held open in downstream sections of the processing drum 14. In this case, the printed products 10 are conserved in the open state from the feeding section 22.3 of the processing drum 14 into the compartments 44 of the circulating conveyor 40 when running through the path section 36, 50'.

Figure 6:
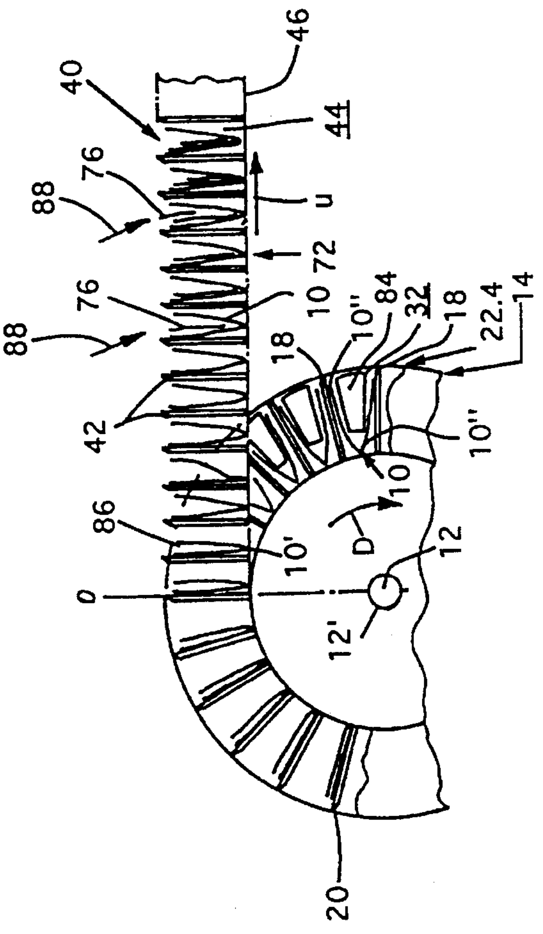
FIG. 6 shows, parts of the apparatus of FIG. 1, processing printed products which have been inserted into the compartments of the processing drum with their fold in front.

FIG. 6 illustrates an embodiment of an apparatus for the insertion of printed products 10 and inserts 76. The feeding device 28, has deposited the printed products 10 into the compartments 32 with the fold 10' in first. These printed products 10 are fed to the circulating conveyor 40 in a manner analogous to the manner disclosed for the printed products 10 shown in FIGS. 1 to 4. In this embodiment, each receiving compartment 44 has an associated opening element 86 which functions to open the printed products 10. Opening elements 86 which are suitable for this purpose are disclosed, for example, in U.S. Pat. No. 5,104,108 and the corresponding EP-A-0346578 application. Inserts 76 are inserted into the printed products 10 at subsequent feeding stations 88 arranged one behind the other, along the direction of circulation U and along upper strand 72. The printed products 10 provided with the inserts 76 are then fed to the next feeding section 22.4 of the processing drum 14 for further processing. In feeding section 22.4, the compartments 32 may include holding-open means 84 that function to hold the printed products 10 open for the insertion of additional inserts.

Figure 7:
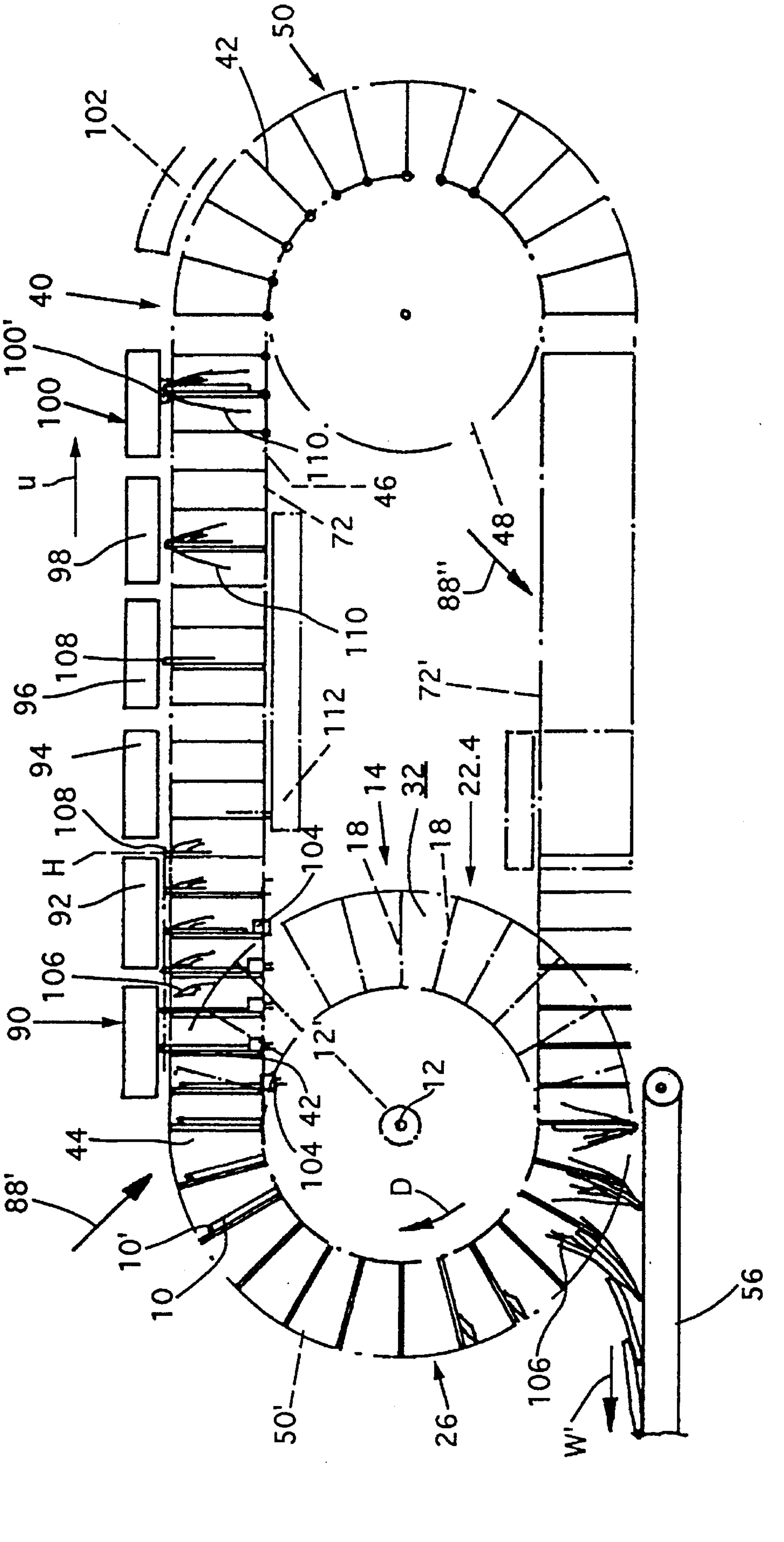
FIG. 7 shows, the entire circulating conveyor in an embodiment in which processing stations for producing adhesive binding on the printed products are arranged along the circulating conveyor.

FIG. 7 discloses another embodiment of the apparatus according to FIG. 1. This embodiment includes machining stations that are necessary for the adhesive binding of the printed products 10 that are arranged one behind the other along the circulating conveyor 40. Multiple-leaf printed products 10 have been deposited into the compartments 32 by the feeding device 28 and the feeding stations 30 assigned to the feeding sections 22.2 and 22.3. The leafs of the printed products lie flat against one another and form small stacks. The printed products 10 have been deposited with the open edge first. The printed products 10 collated in this manner are as has been described above, fed from the compartments 32 to the receiving compartment 44 of the circulating conveyor 40.

As is indicated by the arrow 88', an additional printed product 10 can be deposited directly into the receiving compartment 44. This takes place preferably just before or in the region of the upper strand 72, where the printed products 10 are at a standstill, with regard to their movement in the axial direction.

A straightening station 90, milling station 92, precision-machining station 94, glue-applying station 96, cover-supplying station 98 and pressing-on station 100 are arranged one behind the other along the upper strand 72, along the direction of circulation U. A drying station 102 is, in addition, provided in the region of the movement path 50 of the receiving compartment 44 around the deflection member 48.

In the straightening station 92, the collated printed products 10 are raised up by means of straightening cams 104 and aligned along the fold 10'. Controlled clamping members 106 associated with each receiving compartment 44 are then transferred from their open position to the closed position to clamp the straightened printed products 10 against the corresponding wall element 42. The printed products 10 which are held adjacent to the fold 10' in this manner are milled back, in the milling station 92, to the height H in order to form a spine 108. Improvement work to the surface of the spine 108 is carried out in the precision-machining station 94, and a layer of adhesive is applied to the spine in the glue-applying station 96. A folded cover 110 is then deposited, in the cover-supplying station 98, in a straddling manner on the spine 108 of the printed product 10 such that it can in the pressing-on station 100, be pressed on by means of pressing-on elements 100' which travel with the printed product over a section. Finally, the adhesive is dried in the drying station 102. The printed products 10 which are adhesively bound and provided with a cover 110 in this manner are, by moving the clamping members 106 into the open position, in the region of the processing drum 14, allowed to fall onto the belt conveyor 56 to be conveyed away. If, however, further processing is carried out or if further printed products or inserts are to be added to the printed product 10, then the printed product, in the movement-path section 50', is fed in the conveying direction F to the next feeding section 22.4 of the processing drum 14. The finished products are, in this case, transported away by the removal conveyor 54.

As is indicated schematically by 112, machining stations can also be provided directly beneath the upper strand 72 for processing the printed products 10. Also as indicated by the arrow 88" above the lower strand 72' an additional further feeding station, for example, for inserting a card, between the printed product 10 and the cover 110 can be provided. As regards the design and operations of the circulating conveyor 40 shown in FIG. 7 and of the corresponding processing stations, reference can be made to CH Patent Application No. 00 907/94-8 of 25 Mar. 1994 and the corresponding U.S. patent application filed on Mar. 23, 1995.

If certain processing steps in the representative embodiments shown above are not necessary or if there is a change in the number of different printed products 10 or inserts 76 which are to be fed, the corresponding processing and feeding stations 74, 82, 90, 92, 94, 96, 98, 100, 102, 112, 28, 30, 88, 88', 88" may be disconnected and the processing stations replaced by others. Thus, the apparatus of this invention can thus be used in an extremely flexible manner.

FIG. 8 is a simplified view similar to FIG. 1, of a plan view of an embodiment of the invention, having a processing drum 14 driven in the direction of rotation indicated by arrow D, a first circulating conveyor 40 and a double circulating conveyor 114. The processing drum 14 has three successive feeding sections 22.1, 22.2 and 22.3 which are followed by the circulating conveyor 40. Two feeding sections 22.4 and 22.5 are arranged downstream of said circulating conveyor 40, along the conveying direction F. Feeding sections 22.4 and 22.5 are followed, by the double circulating conveyor 114. The width, along the conveying direction F, of said double circulating conveyor 114 is equal to approximately two sections of the processing drum 14 or the circulating conveyor 40. Although not illustrated in this simplified view, the double circulating conveyor 114 has separating elements 42 and receiving compartments 44 of the length illustrated in FIG. 1. In the region of the lower strand of the double circulating conveyor 114, there are transverse conveying mechanisms 116 indicated by chain-dotted lines, which could, for example, be slotted guides or a conveying belt. Transverse conveying mechanisms 116 function to displace the printed products 10, along the conveying direction F and transversely with respect to the direction of circulation U. Thus printed products 10 that are straddling the separating elements 42 or in the receiving compartment 44 can be moved transversely. In the section 50' of the movement path of the separating elements 42 and receiving compartment 44 of said double circulating conveyor 114, the printed products 10 are fed in conveying direction F to the removal section 24 of the processing drum 14. The finished printed products 10 are then removed from the processing drum 14 and guided away by means of the removal conveyor 54. In this representative embodiment, two different processing steps are carried out on the printed products 10. A font processing step is performed when the printed products 10 are located in the circulating conveyor 40 and a second when they are located in the double circulating conveyor 114. In principle, the processing drum 14, the circulating conveyor 40 and the double circulating conveyor 114 shown in FIG. 8 operate similar to the embodiment shown in FIG. 1. For reasons of clarity, however, in FIG. 8 only the path 38 of the printed products 10 is indicated. Portions of the path sections above a horizontal plane through the axis 12 are indicated by solid lines, and those beneath said plane are indicated by broken lines. The arrow 56 symbolizes an optional belt conveyor 56 that could be used for transporting printed products 10 away. Double circulating conveyors of the type disclosed in U.S. Pat. No. 5,292,110, and corresponding EP-A-0510525 application or in U.S. Pat. No. 4,743,005 and the corresponding CH-A-669944 patent could be used in this embodiment.

FIG. 9 view of an embodiment of the invention having a plurality of processing drums 14. The printed products 10 can be passed from one processing drum 14 to the next, or the printed products 10 can be guided away from a processing drum 14, by a circulating conveyors 40. In a first arrangement of this embodiment, which is shown in solid lines, a first printed product is fed to the first processing drum 14 by the feeding device 28. The printed product is displaced in conveying direction F as the processing drum 14 revolves. As the printed product is conveyed in this direction F, processing steps are carried out on said printed products or additional printed products are added. The removal section 24 of this processing drum 14 has a circulating conveyor 40 which is driven synchronously with the processing drum 14, in the direction U that corresponds to the direction of rotation D. The circulating conveyor 40 feeds the printed products to the second processing drum 14'. In this arrangement, the two processing drums 14, 14' are spaced apart from one another in the horizontal direction, the axes of rotation 12, however, being parallel. The second processing drum 14' joins the circulating conveyor 40 directly in the axial direction with its first feeding section 22.1. The displacement of the printed products in conveying direction F from the circulating conveyor 40 into the second processing drum 14' takes place by means of conveying elements in the processing drum 14'. The conveying elements are of the type illustrated in FIGS. 3 and 4 and identified by reference number 34. Arranged downstream of the last section of the processing drum 14', along conveying direction F, is another circulating conveyor 40 which guides the printed products which have been fed to it, away from the processing drum 14' in the direction of circulation U. The arrow 54 indicates a removal conveyor which removes the printed products from the circulating conveyor 40 and conveys them away. The particular advantage of this embodiment, in addition to maintaining the position of the printed products, is that, in the region of the circulating conveyors 40, processing steps can be carried out on the printed products and/or further printed products can be added.

Two further arrangements of processing drums 14', 14" and circulating conveyors 40 are illustrated in chain-dotted lines in FIG. 9. The present invention thus also permits optimum utilization of space.

It Should be noted that conventional devices are, of course, provided to prevent the printed products 10 from falling downwards off the processing drum 14 and the circulating conveyor 40. When clamp type conveying elements 34 are used they also serve to hold the printed products 10. For a complete disclosure of clamp type conveying elements reference may be had to U.S. Pat. Nos. 5,052,667, 5,052,666 and 4,981,291 and the corresponding EP-A-0341425, EP-A-0341424, EP-A-0341423 applications. If, as is shown in FIGS. 2–4, the conveying elements 34 are designed as sliding cams, then endless retaining bands can be used to enclose the processing drum 14. Retaining means of this type are disclosed, for example, in U.S. Pat. No. 5,324,014 and the corresponding EP-A-0550 828 application and in U.S. Pat. No. 3,951,399 and the corresponding CH-A-584153 patent.

In the circulating conveyors 40, the printed products 10 may be prevented from falling downwards, for example, by clamping members 106 that are illustrated in FIGS. 7. However, endless retaining bands, which run along with the separating elements 42 and are arranged beneath to prevent the printed products from falling downwards could be used. For a more complete disclosure of such retaining device reference may be had to U.S. Pat. No. 5,292,110 and the corresponding EP-A-0510525 application.

In some circumstances, the conveying elements 34 serve to move the printed products 10 from the processing drum 14 to the circulating conveyor 40, and also to displace the printed products 10 in the processing drum 14. However, separate conveying elements for the circulating conveyor 40 can be provided.

It is intended that the accompanying Drawings and foregoing detailed description is to be considered in all respects as illustrative and not restrictive, the scope of the invention is intended to embrace any equivalents, alternatives, and/or modifications of elements that fall within the spirit and scope of the invention, and all changes which come within the meaning and range of equivalency of the claims are therefore intended to be embraced therein.

What is claimed is:

1. An apparatus for processing printed products including:

a processing drum, said processing drum having an axis of rotation that is generally horizontal, said processing drum being rotatably driven about said axis of rotation;

said processing drum having compartments for the printed products, said compartments opening toward the outside in the radial direction of the processing drum, said compartments being separated from one another by wall elements that extend generally in the direction of said axis of rotation and are distributed uniformly along the circumference of said processing drum;

a feeding device for supplying printed products to said processing drum;

a removal station that is offset, in the direction of the axis of rotation with respect to the feeding device by which the printed products are transported away from said processing drum;

transporting devices associated with the compartments that function to transport the printed products along the processing drum, as the processing drum revolves, in the direction from said feeding device to said removal station;

feeding stations arranged between said feeding device and said removal station at which the printed products can be processed and additional printed products or inserts added;

a circulating conveyor including an endless conveyor, said endless conveyor having a movement path that extends around said axis of rotation and around a deflection drum spaced from and generally parallel to said processing drum, said circulating conveyor including receiving compartments that open towards the outside and are separated from one another by separating elements, said separating elements are arranged one behind the other on said endless conveyor;

said circulating conveyor being associated with one of the feeding device, the removal station and between the feeding device and the removal station;

said separating elements and receiving compartments, during a section of their movement path around the axis of rotation, become aligned with said wall elements and compartments, respectively, of said processing drum, such that they, as seen when looking in the direction of said axis of rotation, join said wall elements and said compartments;

transporting elements associated with said wall elements and said separating elements and operative in said section of their movement path to transport said printed products, that are in said compartments or receiving compartment or, are straddling said wall or separating elements, said transporting elements moving in a direction, that is generally parallel to said axis of rotation, from said compartments and said wall elements to said receiving compartments and said separating elements and vice versa; and and processing or feeding stations arranged along the circulating conveyor.

2. The apparatus as claimed in claim 1, wherein, when said compartments, receiving compartments, wall elements and separating elements are aligned, the corresponding transporting elements performs a conveying displacement and a return displacement, and said transporting elements, during the conveying displacement, function to convey printed products from the compartments into the receiving compartment and vice versa.

3. The apparatus as claimed in claim 2, wherein a plurality of feeding stations are arranged one behind the other, along said processing drum, spaced along the direction of the axis of rotation and function to introduce additional printed product into said compartments or to deposit printed product in a straddling manner on said wall elements, said wall elements providing a saddle-like rest at their radially outer end, and wherein there is arranged, between two successive feeding stations, a circulating conveyor which guides the printed products which have been fed to it away from the processing drum and guides them back to the latter again.

4. The apparatus as claimed in claim 3, wherein said circulating conveyor includes transverse conveying mechanisms, which function to move printed material in the direction transverse to the direction of circulation, such that in another section of the movement path the printed products can be moved to said receiving compartment.

5. The apparatus as claimed in claim 2, wherein a second processing drum having a second axis of rotation that is generally parallel to said axis of rotation is located adjacent said processing drum;

a removal device associated with said removal station of said processing drum, said removal device includes a continuous conveyor that extends around said axis of rotation and said second axis of rotation and functions as a feeding device to transport the printed products between said processing drum and said second processing drum.

6. The apparatus as claimed in claim 2, wherein a removal device is associated with said removal station of said processing drum, said removal device includes a circulating conveyor, said circulating conveyor that functions to transport printed products away from said processing drum.

7. The apparatus as claimed in claim 1, wherein a plurality of feeding stations are arranged one behind the other, along said processing drum, spaced along the direction of the axis of rotation and function to introduce additional printed product into said compartments or to deposit printed product in a straddling manner on said wall elements, said wall elements providing a saddle-like rest at their radially outer end, and wherein there is arranged, between two successive feeding stations, a circulating conveyor which guides the printed products which have been fed to it away from the processing drum and guides them back to the latter again.

8. The apparatus as claimed in claim 7, wherein said circulating conveyor includes transverse conveying mechanisms, which function to move printed material in the direction transverse to the direction of circulation, such that in another section of the movement path the printed products can be moved to said receiving compartment.

9. The apparatus as claimed in claim 1, wherein a second processing drum having a second axis of rotation that is generally parallel to said axis of rotation is located adjacent said processing drum;

a removal device associated with said removal station of said processing drum, said removal device includes a continuous conveyor that extends around said axis of rotation and said second axis of rotation and functions as a feeding device to transport the printed products between said processing drum and said second processing drum.

10. The apparatus as claimed in claim 1, wherein a removal device is associated with said removal station of said processing drum, said removal device includes a circulating conveyor, said circulating conveyor functions to transport printed products away from said processing drum.

* * * * *

UNITED STATES PATENT AND TRADEMARK OFFICE
CERTIFICATE OF CORRECTION

PATENT NO. : 5,562,278

DATED : October 8, 1996

INVENTOR(S) : Erwin Muller, et. al.

It is certified that error appears in the above-identified patent and that said Letters Patent is hereby corrected as shown below:

Title page, item [73], Assignee: after Ferag AG, delete "Hinwi" and insert -- Hinwil--.

Signed and Sealed this

Second Day of June, 1998

Attest:

BRUCE LEHMAN

*Attesting Officer* *Commissioner of Patents and Trademarks*